United States Patent [19]
Johnson

[11] 3,970,791
[45] July 20, 1976

[54] VOICE CONTROLLED DISAPPEARING AUDIO DELAY LINE

[75] Inventor: George B. Johnson, La Jolla, Calif.

[73] Assignee: The United States of America as represented by the Secretary of the Navy, Washington, D.C.

[22] Filed: May 27, 1975

[21] Appl. No.: 581,060

[52] U.S. Cl. ............................................ 179/1.5 S
[51] Int. Cl.[2] ............................................ H04M 1/70
[58] Field of Search .................. 179/15.55 T, 1.5 R, 179/1.5 S; 178/22

[56] References Cited

UNITED STATES PATENTS

| | | | |
|---|---|---|---|
| 2,539,556 | 1/1951 | Steinberg | 179/1.5 S |
| 3,694,757 | 9/1972 | Hughes | 178/22 |
| 3,813,493 | 5/1974 | Hughes | 179/1.5 S |

*Primary Examiner*—Kathleen H. Claffy
*Assistant Examiner*—E. Matt Kemeny
*Attorney, Agent, or Firm*—R. S. Sciascia; G. J. Rubens; T. M. Phillips

[57] ABSTRACT

A delay line which disappears under voice control is comprised of a plurality of shift registers delays the incoming voice signal to permit transmission of the voice scrambler preamble. The delay is removed over a period of time during speech transmission by removing a segment of the delay line each time a pause of a specified length is detected in the speech.

9 Claims, 14 Drawing Figures

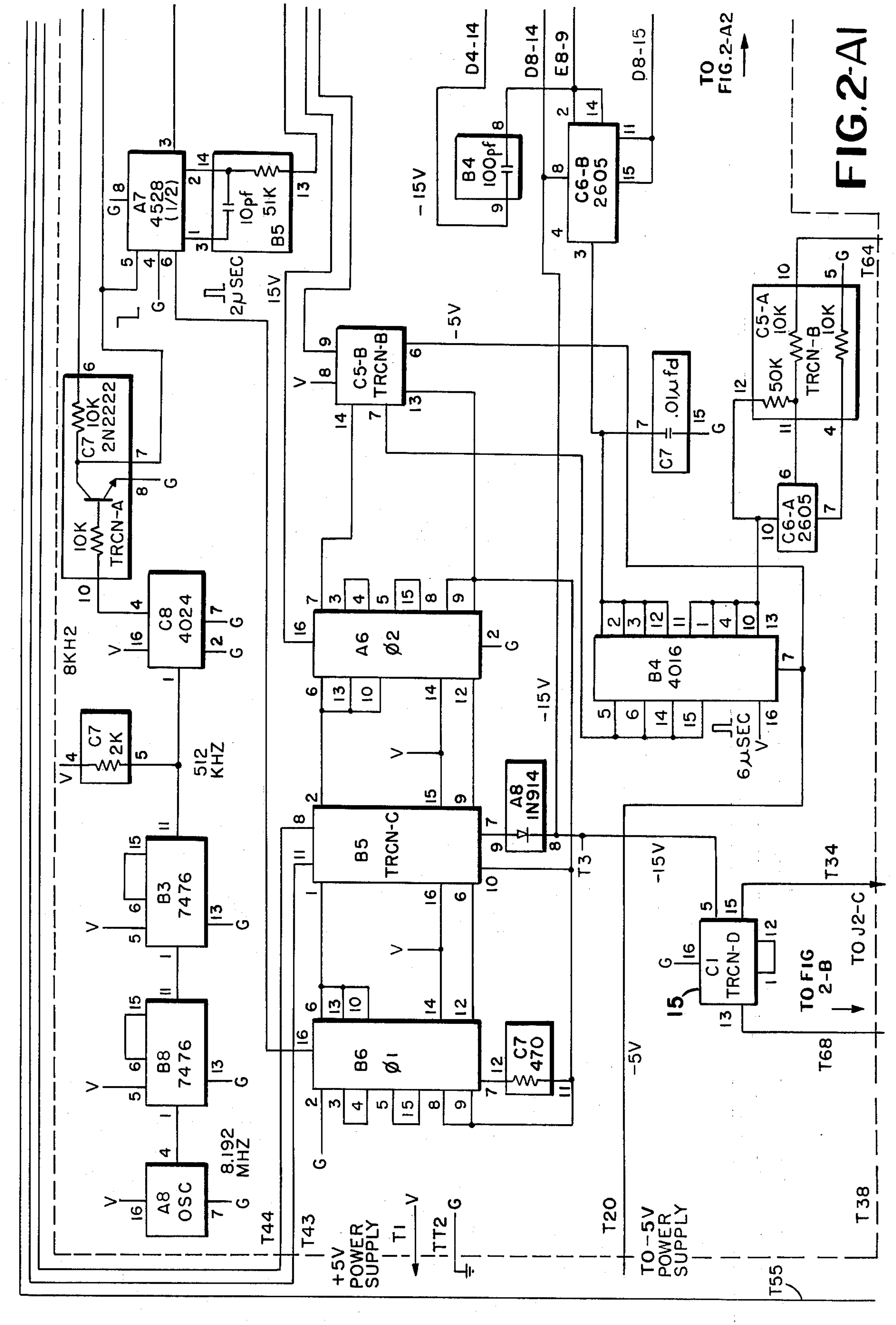
FIG. 2-A1

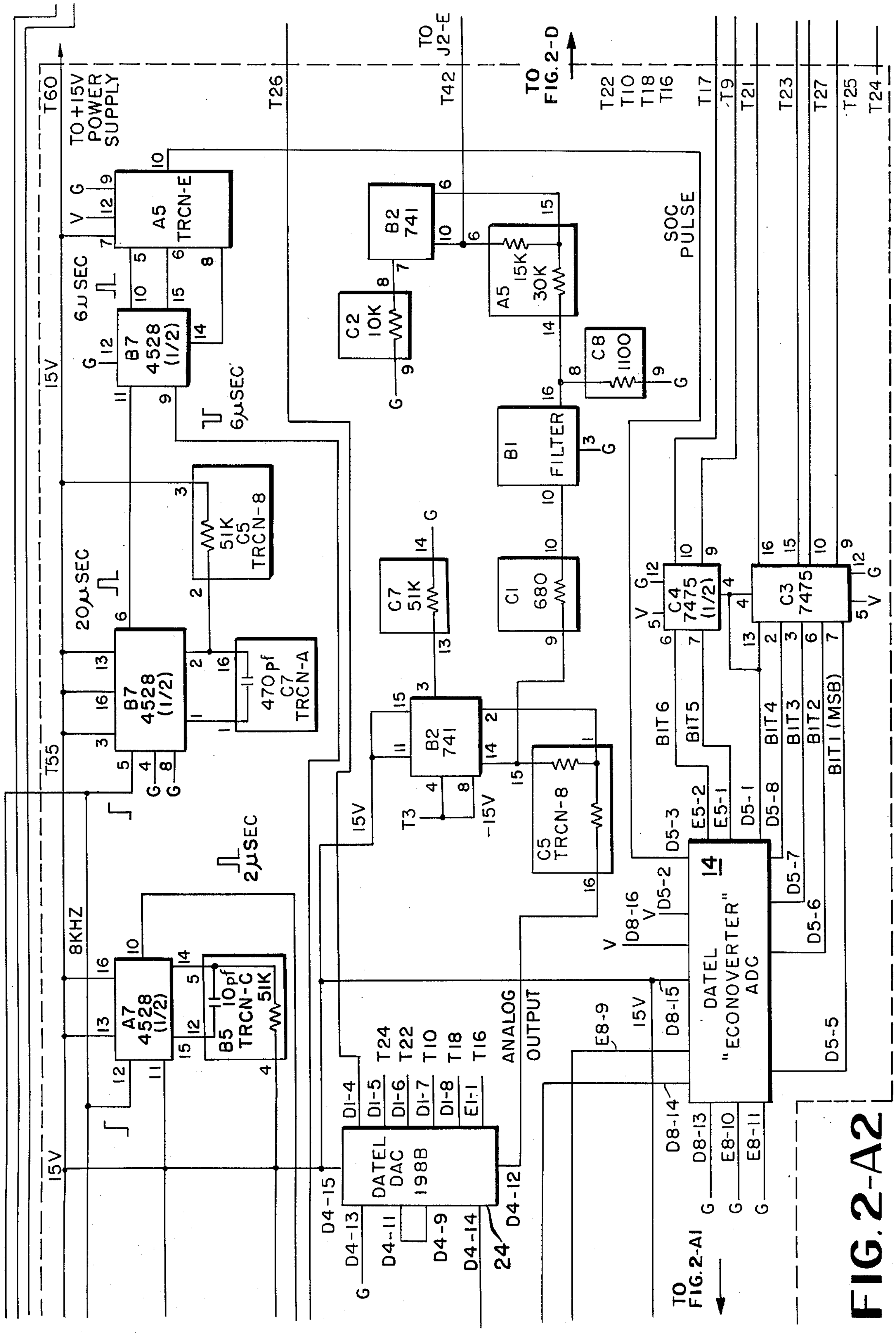
FIG. 2-A2

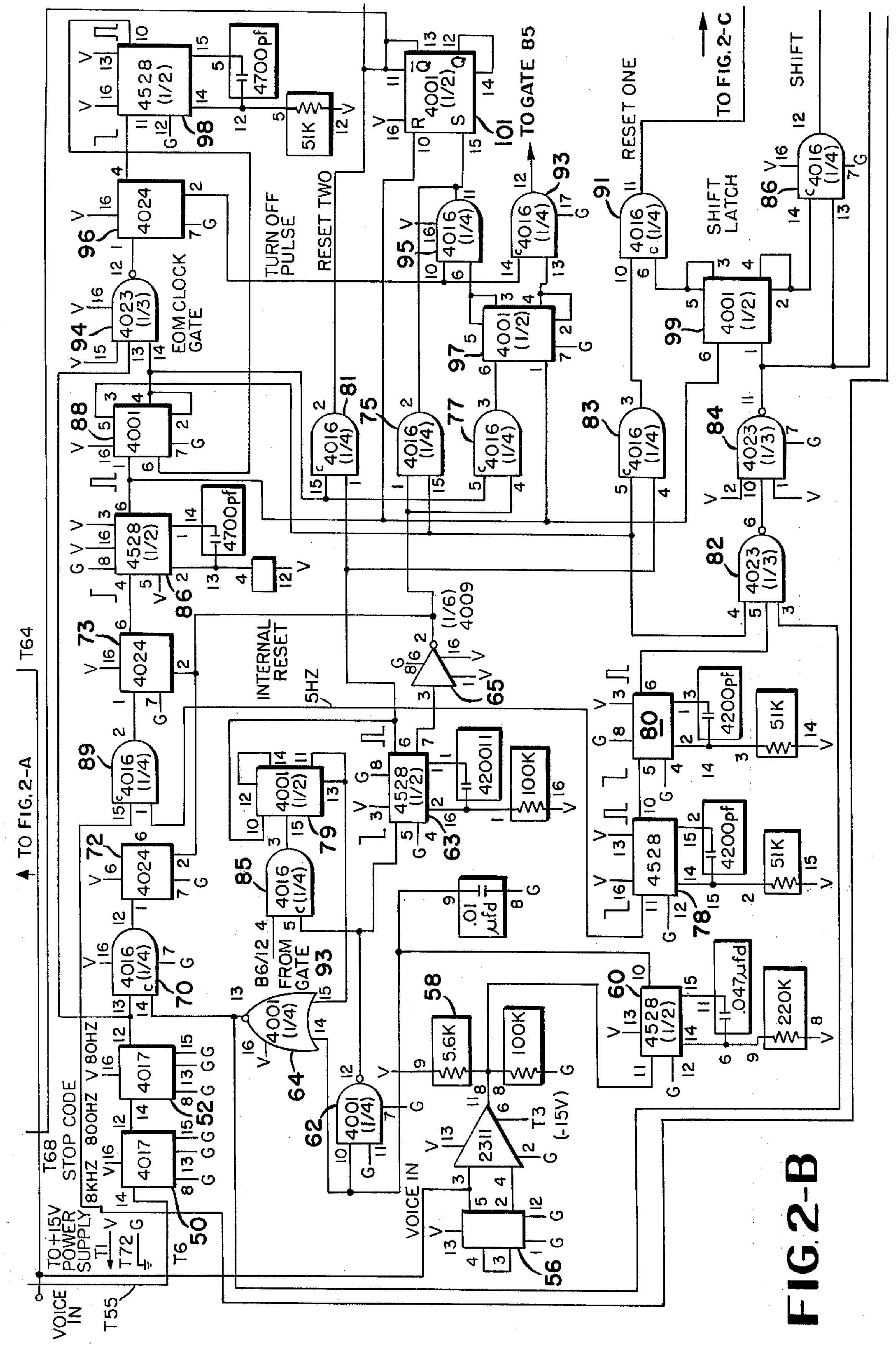
FIG. 2-B

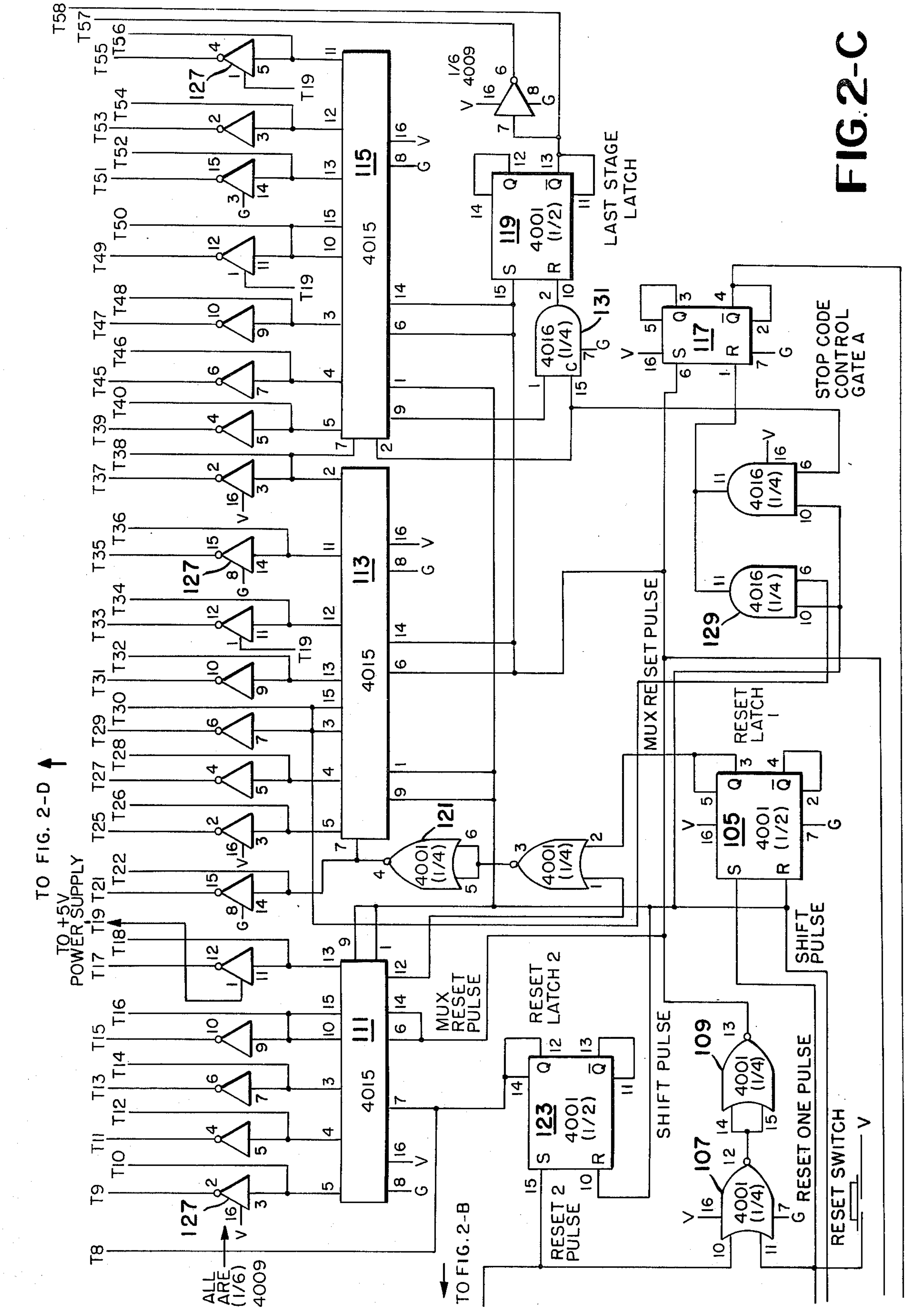
FIG. 2-C

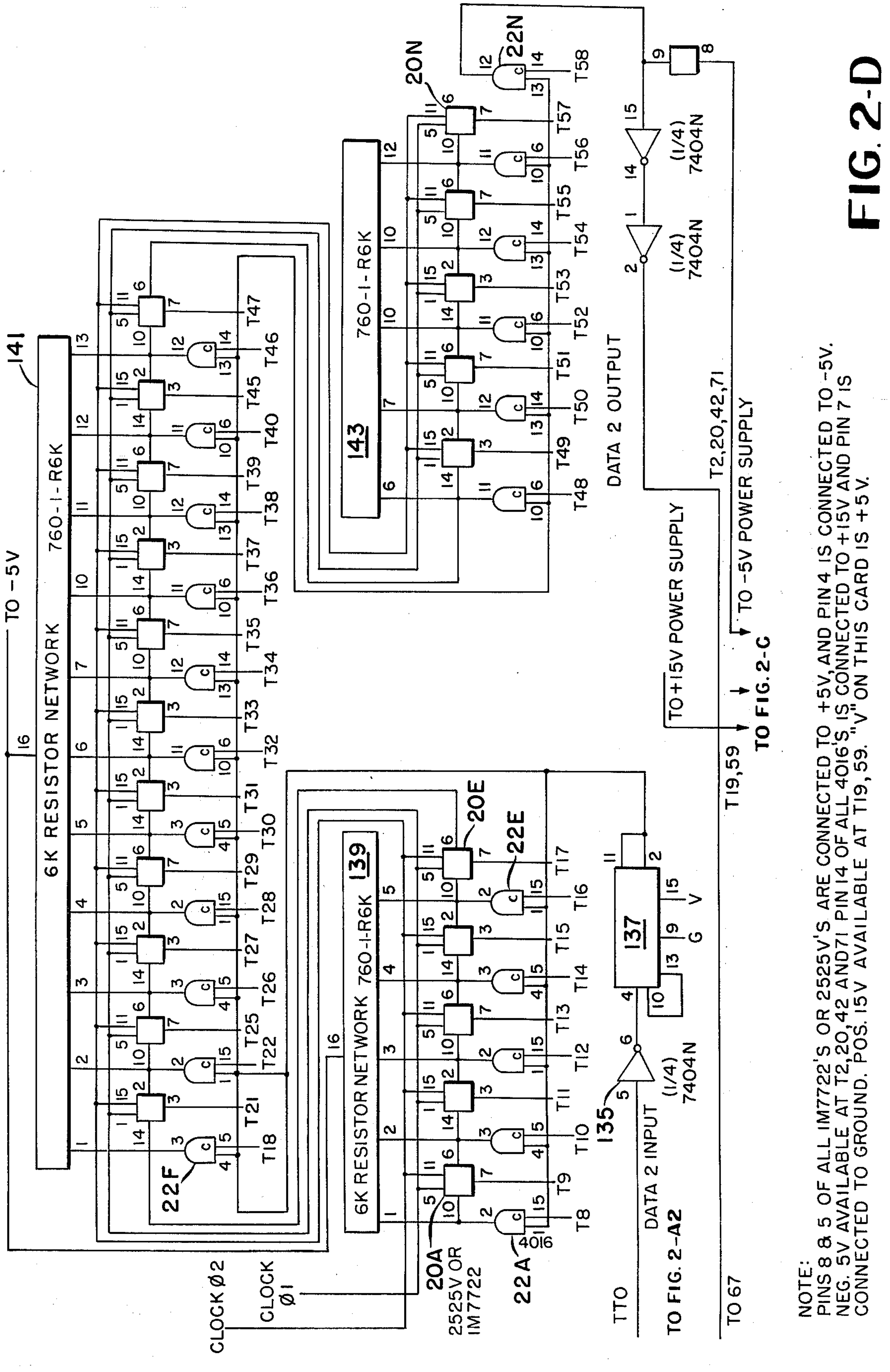
FIG. 2-D

VOICE CONTROLLED DISAPPEARING AUDIO DELAY LINE

BACKGROUND OF THE INVENTION

Some complex voice scramblers used by the U.S. Armed Forces transmit preambles before passing the voice signal. It is usually necessary that the communicator key the scrambler and then wait for the preamble to be transmitted before he speaks. Also where "full duplex" operation is used that provides separate frequency for transmitting and receiving, it is desirable for more efficient operation to remove any delay caused by the transmission of a preamble or a postamble.

The present invention provides a voice-controlled disappearing audio delay line control circuit so that a "hot mike" voice circuit can be fed into a voice scrambler. The operator then need not key the scrambler. There is no waiting for the preamble transmission before speaking. The voice scrambler can be remote from the operator with no intervening special control lines, since only the voice signal is required to control the scrambler.

SUMMARY OF THE INVENTION

The present invention provides a voice controlled disappearing audio delay line for use with a secure voice communication system wherein automatic voice keying of a scrambler with a preamble is utilized. Delay of the voice signals to permit transmission of the preamble is accomplished by providing a segmented delay line wherein, with the initiation of the voice operated switch all of the delay line is inserted to allow the preamble to be transmitted. A pulse sorting and recognition means is provided which provides an output pulse each time a pause of a specified length is observed in the speech. The pulse is fed to a multiplexer which provides a pulse to control gating means to remove a segment of the delay line each time one of the pauses of sufficient duration is detected. By this means all of the delay line is removed and the turn-around time required in the half-duplex communication system is reduced.

Accordingly, an object of the invention is to provide a voice control disappearing audio delay line for use in a communication system.

Another object of the invention is a provision of a voice control disappearing audio delay line for use in a secure voice communications system to provide for a reduction in turn-around time required by the circuitry of the communication system.

Another object is a provision of a voice control disappearing audio delay line for use in a secure voice communications system to permit the voice scrambler unit to be used on a "hot" mike network.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIGS. 2A through 2D are schematic diagrams of the embodiment of FIG. 1.

DESCRIPTION OF THE PREFERRED EMBODIMENTS

Figure 1:
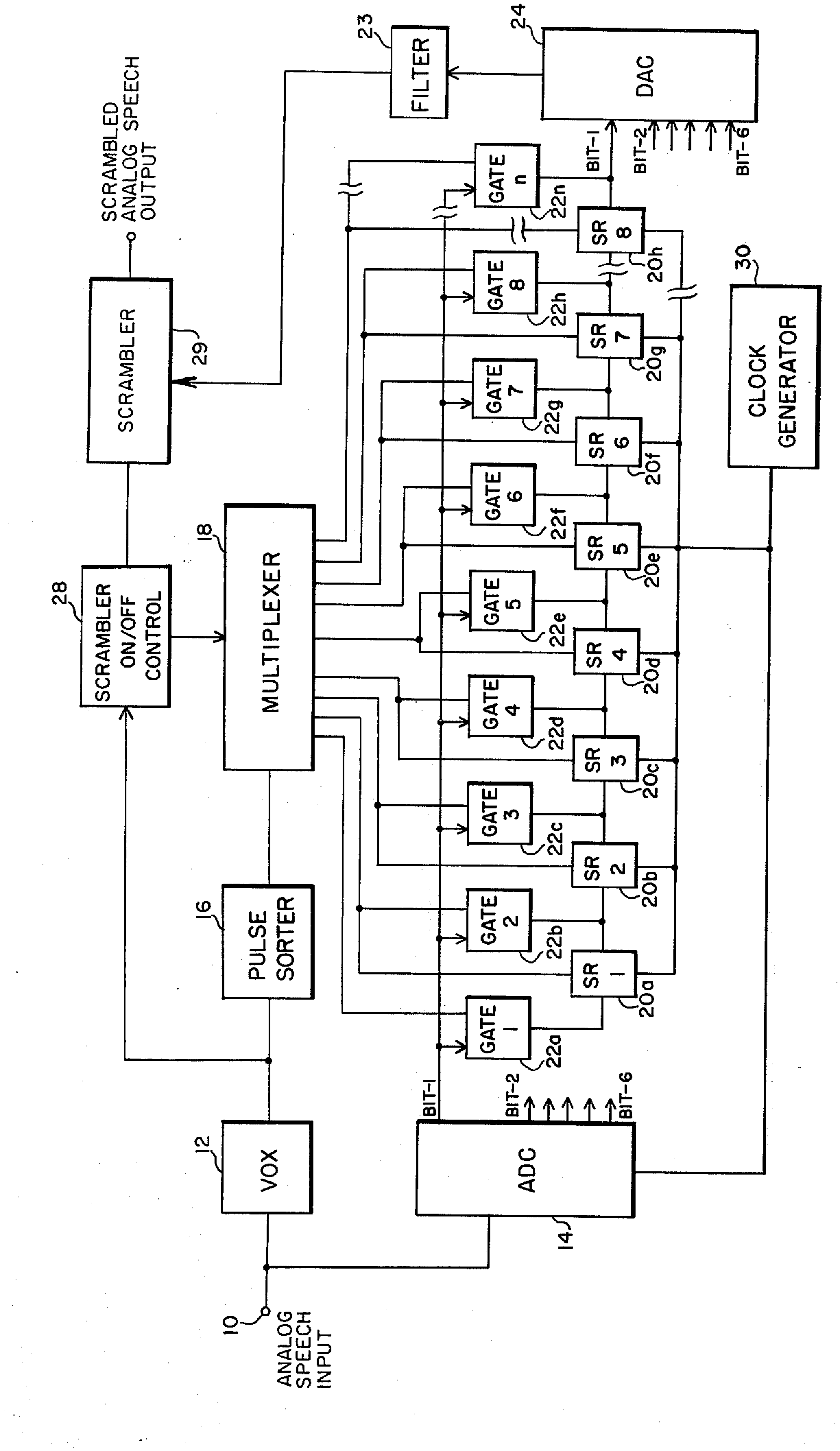
FIG. 1 is a block diagram of the disappearing delay line embodying the present invention.

Referring now to FIG. 1 wherein there is shown an input terminal 10 for receiving a speech signal to be transmitted that is fed to both the voice-operated switch 12 and the analog-to-digital converter 14. The voice-operated switch (VOX) 12 output is positive whenever the speech signal input at 10 is below a preset threshold. The output from switch 12 is fed into a pulse sorter 16. Whenever positive pulses longer than 200 milliseconds occur, pulse sorter 16 will provide a shift pulse to multiplexer 18. As envisioned by the invention each bit signal from analog-to-digital converter 14 is fed through a delay line comprised of shift registers **20*a* through 20*n*. There would be a 6 delay lines connected to the output of analog-to-digital converter 14, however, for simplicity and ease of description only one delay line is described. Each of shift registers 20*a* through 20*n* is controlled by a gate circuit 22*a* through 22*n*. After the signal passes through the delay line it is received in digital-to-analog converter 24 and fed through a filter 23 to the scrambler circuit 29 of the secure communication system, (not shown). Timing pulses are supplied by the clock generator 30. In operation and by way of example shift registers 20*a* through 20*n* are 1024-bit long and the clock pulse rate is 8KHz.**

Each of the analog-to-digital output bit streams are fed to gates **20*a* through 20*n*. Every gate in a delay line is a possible feed point for the delay line. Only one gate in each of the six parallel delay lines is opened by an output level from multiplexer 18** at any time. Corresponding gates in each of the 6 delay lines are controlled in parallel.

The initial feed point of the delay line is gate **22*a*. The first pause in speech which is greater than 200 milliseconds will cause pulse sorter 16 to send a pulse to multiplexer 18 which in turn acts on gate 22*a* and 22*b* to close gate 22*a* and open 22*b* and thereby shorten the delay line by 128 milliseconds. Since the pause is at least 200 milliseconds long, no information is contained in the 128 milliseconds of digital signal bypassed in shift register 20*a*. Shift pulses are produced by pulse sorter 16 every 200 milliseconds of continuous pause in speech. The output control signal from multiplexer 18** which opens gate *n* in each delay line also places shift register (*n*-1) in the read-only state. As additional shift pulses from pulse sorter 16 reach multiplexer 18, the feed point moves up the delay line until gate **22*n* becomes the feed point. When gate 22*n*** is the feed point, the six digital outputs of the analog-to-digital converter are fed directly to the digital-to-analog converter to be reconverted into a single analog signal (speech).

At the end of a transmission (automatically determined by the scrambler on/off control detecting a high level of 1.6 seconds duration) the multiplexer is reset to open gate **22*a* in each of the delay lines. Then the next speech transmission begins. The beginning of this speech transmission is delayed the full (128**×*n*) milliseconds.

Figure 3:
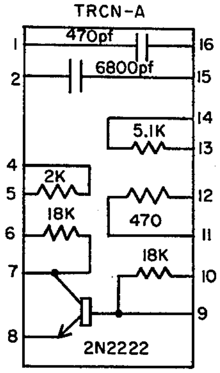
FIG. 3 — 10 are schematic diagrams of header mounted circuit components used in the diagram of FIGS. 2A–2D.
Figure 4:
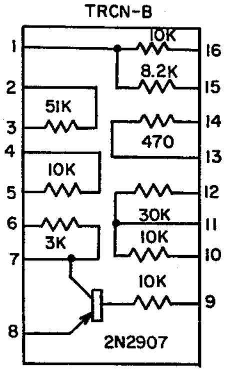
Figure 5:
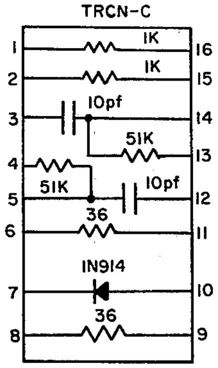
Figure 7:
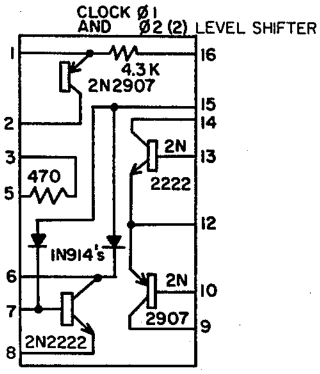
Figure 10:
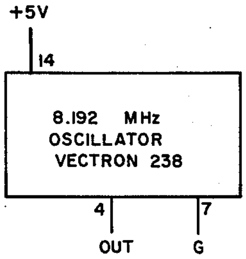

Referring now to FIGS. 2–A through 2–D where there is shown in schematic diagram the embodiment of FIG. 1 and referring to FIGS. 2A1 and 2A2, oscillator A8 (FIG. 10) generates a 8.192 MHz signal. The output signal from oscillator A8 is fed to a dual flip-flop B8 which divides the frequency of the signal down to 2.048MHz. The output of B8 is then fed to a divide-by-four circuit B3 to produce a 512KHz signal. The 512KHz square wave is then fed to the binary counter C8 which divides the signal by 64 ($2^6$), providing a clock frequency of 8KHz between 0 and +5 volts. This 0 to +5 volt signal is converted to a 0 to +15 volt signal in the Transistor-Resistor-Capacitor Network-A (TRCN-A), (FIG. 3) in C7. The 8KHz signal taken from pin 7 of C7 is applied to the pulse sortertiming circuit via conductor T55. The output of the 8KHz square wave from pin 7 or C7 is fed to the inputs of dual multivibrator A7. During the negative transition of the 8KHz square wave the output of pin 6 of multivibrator A7 is a positive pulse of approximately 2 microseconds duration. During the positive transition of the 8KHz clock the output of pin 10 of multivibrator A7 is a positive pulse of approximately 2 microseconds. These two clock pulses each have a repetition rate of 8KHz, but are 180° out of phase. The clock $\phi 1$ level shifter is located in B6 (FIG. 7), the TRCN-C (FIG. 5) and TRCN-A. Clock $\phi 2$ level shifter is located in A6 (FIG. 7), TRCN-C and TRCN-B (FIG. 4). The input to the level shifters is a 0 to +15 volt pulse and the output is negative going pulse from +4.5 volt to −11.4 volts. The output of clock $\phi 1$ is applied to lead T43 and the output of clock $\phi 2$ is applied to lead T44. These two outputs provide the clock pulses for the delay circuits of FIG. 1 and of FIG. 2D.

Figure 8:
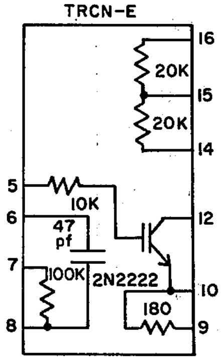

The positive 20 microsecond pulse from pin 6 of the first half of multivibrator B7 is fed to the input of pin 11 of the second half of multivibrator B7. The negative going transition of this pulse causes a 6 microsecond, $\phi$ to +15, positive pulse at pin 10 of multivibrator B7 and a +15 volt to 0 volt negative 6 microsecond pulse at pin 9 of multivibrator B7. The positive 6 microsecond pulse from pin 10 of multivibrator B7 is fed to level shifter A5 (TRCN-E, FIG. 8) where it is converted to a 0 to +5 volt level. The 0 to +5 volt positive 6 microsecond pulse is the START OF CONVERSION pulse and is applied to pin 3 of the analog-to-digital converter 14.

The negative 6 microsecond pulse from pin 9 of multivibrator B7 is fed to pin 9 of level shifter C5 which provides a −5 to +5 volt pulse output at pin 7 which is fed to pins 5, 6, 14 and 15 to open the input analog gate B4.

Figure 6:
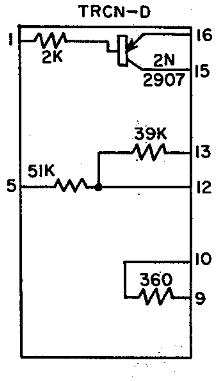

The input to a sample and hold circuit (comprising gate B4, capacitor C7 and amplifier C6B) is in parallel with the input to the voice operated switch (FIG. 2B). The voice input signal to the sample and hold circuit is connected through lead T64 from FIG. 2B. The voice input is fed through TRCN-D (FIG. 6) to amplifier C6-A where it is amplified by a factor of −3. The output from amplifier C6-A at pin 10 is fed to the inputs of the 4 parallel analog gates, pins 1, 4, 10, and 13 of analog gate circuit B4. The 8KHz 6 microsecond pulse from pin 7 of C5-B opens the analog gates via pins 5, 6, 14, and 15. Capacitor C7, is a storage cell for the voltage until the next sample occurs. The gated signal is also fed to pin 3 of amplifier C6-B which has a negative unity gain. The output of amplifier C6-B at pin 14 is fed to the analog input, E8-9, of the analog-to-digital converter 14. The most significant bit (MSB) from terminal D5-5 of analog-to-digital converter 14 is fed to pin 7, the input of one of 6 bistable latches contained in C3 and C4. The remaining 5 bits of the analog-to-digital converter 14 are applied to the remaining 5 bistable latches in C3 and C4. The latches of C3 and C4 are clocked in parallel by the end of conversion pulse from pin D5-1 of analog-to-digital converter 14. The six outputs of latches C3 and C4 are applied as the data inputs respectively, to the six digital delay lines. The six outputs are as follows:

| | |
|---|---|
| Bit 1 (MSB) | T25 |
| Bit 2 | T27 |
| Bit 3 | T23 |
| Bit 4 | T21 |
| Bit 5 | T9 |
| Bit 6 (least significant bit) | T17 |

The digital inputs from the delay lines to the digital-to-analog converter 24 are as follows:

| | |
|---|---|
| Bit 1 (MSB) | T26 |
| Bit 2 | T24 |
| Bit 3 | T22 |
| Bit 4 | T10 |
| Bit 5 | T18 |
| Bit 6 (LSB) | T16 |

The output of the digital-to-analog converter 24 at pin D4-12 is fed through impedance matching amplifier B2 to the low pass filter B1. The output of the low pass filter B1 is further amplified in the second stage of amplifier B2 to provide the voice signal at output terminal 17.

The circuit that controls scrambler from receive to transmit is scrambler control circuit 15. The scrambler keyline at terminal T34 is normally at some negative voltage, between −6 volts and −13 volts, and the scrambler control circuit places the keyline at ground when the scrambler is placed in the covered transmit mode (turned on).

Referring now to FIG. 2B the 0 to 15 volt 8KHz square wave from FIG. 2A2 is fed to two decade counters 50 and 52 which divide the 8KHz signal twice down to 80Hz. The voice signal in an input terminal 54 is fed to the voice operated switch which consists of a threshold adjust 56, amplifier 58, and multivibrator 60. The VOX threshold adjust 56 should be adjusted for a −13dbm. The VOX output from terminal 10 of multivibrator 60 is applied to terminal 10 of NOR gate 62 and terminal 14 of NOR gate 64.

When the VOX output is in the 1 state the output from NOR gate 64 is in a 0 state and the clock gate 70 is closed. When the VOX output shifts to a 0 state AND gate 70 is opened and the 80Hz square wave is applied to input terminal 1 of binary counter 72. Binary counter 72 divides the 80Hz signal by 16, providing a 5Hz square wave output at terminal 11.

When the binary counter 72 output at terminal 6 goes through its negative transition, the first stage of the dual multivibrator 78 generates a positive pulse of 150 microsecond duration. As the trailing edge of this 150 microsecond pulse is generated, the second multivibrator stage 80 generates a positive pulse of the same duration. The output pulse from the second multivibrator stage 80 is the SHIFT pulse. The SHIFT pulse from multivibrator 80 is fed to shift gate 82. If the VOX output is 0 (no voice is present), and if no end of message has been recognized the SHIFT pulse is inverted in NAND gate 84 and passed through AND gate 86 to provide the SHIFT pulse for multiplexer 18.

When the VOX output goes positive the output of NOR gate 62 goes to 0. This negative transition causes mulivibrator 63 to generate a pulse of 300 microsecond duration which appears at output terminals 6 and 7. The output pulse from terminal 7 is inverted in inverter 65 and is the INTERNAL RESET pulse that is applied to reset binary counters 72 and 73. This INTERNAL RESET pulse is also applied to scrambler control gates 75 and 77. The output pulse from terminal 6 of multivibrator 63 is fed to AND gates 81 and 83 to provide RESET PULSE ONE and TWO for multivibrator 18. If a reset is required the 300 microsecond pulse from terminal 6 of multivibrator 63 is also fed to reset turn-off latch 79 which will cause NOR gate 64 input 15 to change to a 0 state.

When the VOX output is 0 the output of NOR gate 62 is a 1 and is fed to turn-off gate 85. Gate 85 is open when a 1 is present at pin 5. This permits any turn-off pulses to set turn-off latch 79. When turn-off latch 79 is set a 1 input is provided for NOR gate 64 which provides a 0 to pin 14 of clock gate 70. Therefore clock gate 70 is closed.

When multiplexer 18 has reached stage 10 or higher, the STOP CODE control signal is generated and fed through input lead 87 and applies a 1 state signal to terminal 15 of STOP CODE GATE 89. Gate 89 is opened and permits the 5Hz output from binary counter 72 to enter binary counter 73. When binary counter 73 receives 8 consecutive positive transitions without being reset by the INTERNAL RESET (meaning no voice signal has appeared for 1.6 seconds), the output, pin 6, of counter 73 will go positive which causes multivibrator 86 to generate a positive pulse of 200 microseconds which appears at its output terminal 6. The output pulse from terminal 6 of multivibrator 86 is the STOP PULSE. The STOP PULSE is used to operate the scrambler control latches and shift control latch, which will be described in more detail below.

The STOP PULSE from multivibrator 86 is also fed to reset the END OF MESSAGE LATCH (EOM). The Q bar output at terminal 4 of the EOM latch, 88, is fed to EOM CLOCK GATE 94. When a signal is received at EOM CLOCK GATE 75 input terminal 14 from EOM latch 88, gate 94 is opened and the 80Hz clock signal from counter 52 is applied to the input of EOM counter, 96. After the EOM counter, 96, receives 64 cycles of the 80Hz clock, which occurs after 800 milliseconds, the output at terminal 4 is a positive transition which is fed to and causes multivibrator 98 to generate a positive pulse of 200 microseconds duration which provides a TURN-OFF PULSE at terminal 10.

When the EOM latch, 88, is reset, multiplexer reset control gate 91 is open. Therefore if a voice signal starts while the EOM latch, 88, is reset the resulting INTERNAL RESET PULSE is passed through multiplexer reset control gate 91 to the multiplexer 18. This signal places the multiplexer 18 in its extended reset state. In this state the digitized voice signal is delayed for 2.688 seconds, to allow the scrambler to pass its postamble and preamble prior to the delayed voice signal entering the scrambler.

The TURN-OFF PULSE from latch 96 is also fed back as a reset pulse to EOM latch, 88. When the EOM latch, 88, is set, the EOM CLOCK GATE 94 is closed. This TURN-OFF PULSE also goes to turn-off gate 93 and the scrambler control gate 95. Both control gates 93 and 95 are controlled by scrambler control latch 97.

If the turn-off gate 93 is open the TURN-OFF PULSE then will be fed to turn-off gate 85. If turn-off gate 85 is open (no voice signal present) the turn off pulse is fed to and sets turn-off latch 79. This provides a 1 state input to NOR gate 64 and a 0 state input to clock gate 70 which shuts off the 80Hz signal to binary counter 72.

During the transmission of a message, a shift pulse is generated every 200 milliseconds during which no voice signal is present. This shift pulse will be transferred to multiplexer 18 if a message is in progress, an EOM signal has not occurred, and no voice signal is present when the shift pulse is generated. The shift pulse generated by multivibrator 80 will pass through shift gate 82 if the output of NOR gate 64 is in the 1 state (no voice present) and if the output from latch 88 is a 1 (no EOM signal). The shift pulse will pass through shift gate 86 if the Q output at terminal 4 of shift latch 99 is in the 1 state. Shift latch 99 will have been reset by the start of a message providing a MULTIPLEXER RESET PULSE. The recognition of an EOM causes the STOP PULSE to set shift latch 99 and thereby prevents shift gate 86 from passing the shift pulse to the multiplexer 18.

When shift latch 99 is set, the multiplexer reset control gate 91 is opened. This allows the internal reset pulse to reset multiplexer 18 if the EOM latch, 88, is also set. The EOM latch, 88, is reset for 800 milliseconds following recognition of an EOM. During this period the INTERNAL RESET PULSE cannot reset the multiplexer.

The shift latch 99 is returned to the reset state by the resetting of multiplexer 18 by either a RESET ONE or RESET TWO. This resetting pulse is the MULTIPLEXER RESET PULSE, previously described, which occurs only at the beginning of a message.

At the start of a message, an INTERNAL RESET PULSE is generated by multivibrator 63. This pulse reaches scrambler control latch 101 through control gate 75 when the Q output at terminal 4 of the EOM latch, 88, is a 1 (at any time within 800 milliseconds after the STOP PULSE). This pulse sets the scrambler control latch 101 which turns on the scrambler by feeding an output signal to scrambler control circuit 15 (shown in FIG. 2-A).

During the 800 milliseconds following recognition of the EOM scrambler control gate 75 is closed and scrambler control gate 77 is open. If a message starts during this 800 millisecond period, the internal reset pulse sets scrambler control latch 97 which opens scrambler control gate 95. The TURN-OFF PULSE which appears at the end of the 800 microsecond period, passes through scrambler control gate 95 and sets scrambler control latch 101 which turns on scrambler circuit C1-A (FIG. 2A).

When the EOM is recognized the STOP PULSE from multivibrator 86 resets scrambler control latches 97 and 101 turning off scrambler control circuit 15.

If no message starts within 800 milliseconds after the STOP PULSE, the TURN-OFF PULSE is passed through the open turn-off gate 93. Turn off gate 93 is opened by the reset state of scrambler control latch 97. This pulse is then provided to turn off gate 85.

The purpose of multiplexer 18 is to control the parallel data streams into each of the 6 delay lines. The multiplexer controls the initial delay line feed point when a message begins by being reset in its normal mode (RESET ONE) or its extended mode (RESET TWO). The schematic of multiplexer 18 is shown in FIG. 2C.

When a reset one pulse reaches the multiplexer it sets the RESET LATCH 1, 105, and is also fed through OR gates 107, 109 and is the MULTIPLEXER RESET PULSE. The reset pulse is fed to and resets all three of the dual 4-bit shift registers 111, 113, and 115, sets the STOP CODE LATCH 117, resets the SHIFT LATCH 99 (FIG. 2B), and sets the LAST STAGE LATCH 119.

While the RESET LATCH 1, 105, is set, its terminals 5 and 3 are in the one state. The output of OR gate 121 then opens data gate 7 in each of the six delay lines. The output of OR gate 121 also provides a one state to the inputs or stage 8 of the multiplexer shift register.

The first shift pulse occurring after a RESET ONE pulse will reset the RESET LATCH 1, 105, and clock all stages of the multiplexer shift register. The effect of the first shift pulse on the multiplexer output will be to close data gate 7 in each delay line and open data gate 8. The following shift pulse will cause the single open data gate in each of the delay lines to close and open the following gates. As each successive shift pulse occurs, the data gates will sequentially open and close until either the last gate (stage 22) is reached, or the message ends. The following message will provide a RESET ONE or a RESET TWO pulse.

When a RESET TWO pulse reaches the multiplexer it sets RESET LATCH 2, 123, and also passes through the reset NOR gates 107, 109 to become the MULTIPLEXER RESET PULSE.

While RESET LATCH 2, 123, is set, its output is a 1, data gate 22A in each delay line is open. The first shift pulse and each succeeding shift pulse after the RESET TWO pulse will have the same effect on the multiplexer described in the RESET LATCH 1 theory discussed above. The multiplexer shift register consists primarily of three dual 4-bit shift registers 111, 113 and 115 connected serially. Each output stage is applied to an inverter 127. As shown in the embodiment there are 22 stages in the multiplexer shift register. The output of only one of these 22 stages is in the 1 state at any time, permitting only 1 data gate in each delay line to be open. When the output of stage N of the multiplexer shift register is 1, the corresponding inverter provides a 0 state to the read-write terminal of the N-1 stage of the delay line.

When the multiplexer is reset, the output of either stage 1 or stage 7 of the multiplexer shift register is 1, depending upon which reset pulse occurs (RESET TWO or RESET ONE, respectively). When stage 1 is in the 1 state the digitized message is delayed for 2.688 seconds, allowing both the postamble and the preamble of the scrambler to be transmitted before the start of the message reaches the scrambler. When stage 7 is in the 1 state a delay of 1.92 seconds is used. This permits only the preamble of the scrambler to be transmitted before the start of the message reaches the scrambler.

The purpose of the stop code circuit as described previously is to activate the end of message recognition circuit when a delay of less than 1.6 seconds exists. After the end of message recognition has been activated (STOP CODE GATE 89 is open and no voice signal appears for 1.6 seconds), a STOP PULSE will be generated and an end of message recognized. By ensuring that less than 1.6 seconds of delay remains when the end of message recognition circuit is activated, no digitized message can be skipped over in the delay lines when the STOP PULSE turns off the scrambler. When the output of multiplexer stage 10 is in the 1 state, STOP CONTROL GATE 129 is open. The next arriving SHIFT PULSE resets the stop code latch 117, if this latch is not already reset. When the stage 22 output of the multiplexer shift register at terminal 2 of shift register 115 goes to 1 state the LAST STAGE GATE 131 is open and the SHIFT PULSE which sets stage 22 of the multiplexer shift register to "1" passes through the LAST STAGE GATE 131 and resets the LAST STAGE LATCH 119. Further SHIFT PULSES are prevented from affecting the feed point of the delay lines and the read-write terminal of stage 21 of each delay line is held at 0. The next MULTIPLEX RESET PULSE to arrive after the LAST STAGE LATCH 119 has been reset will set it again.

Figure 9:
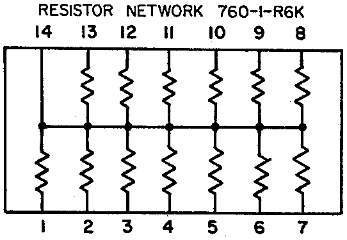

FIG. 2D shows the delay line. There are six identical parallel delay lines and each function in like manner. The data input is coupled through an inverter 135 and buffer 137 to gates **22*a* through 22*n* in parallel. When an extended reset is observed only data gate 22*a* is opened. Digital data is passed into delay line shift register stages 20*a* through 20*n* in each of the six parallel delay lines. Each delay line shift register stage is 1024 bits long. At a clock rate of 8KHz, the data stream which enters data line shift register 22*a* at input 10 of 20*a* will exit at terminal 6, 128 milliseconds later. Two clock pulses, phase 1 and phase 2, drive each delay line shift register stage. The clock pulses are approximatey a 2 microsecond, negative going transition from +4.5 volts to −11.4 volts at 8KHz. Clock phase 1 is leading clock phase 2 by 62.5 microseconds. Power is supplied through resistor network 139, 141, 143 shown in schematic form in FIG. 9.**

The next SHIFT PULSE causes the multiplexer to close data gate **22*a* and open data gate 22*b*. When data gate 22*b* is open the read-write terminal 7 of delay line shift register stage 20*a* is held at 0. This 0 state prevents the output of shift register stage 1 at terminal 6 from passing data to shift register stage 22*b*.** This circuit is redundant as no information data should be in stage N when a SHIFT PULSE occurs to shift the input to stage N+1.

The embodiment of the invention described uses a six-bit, parallel, analog-to-digital and digital-to-analog conversion technique with a conversion rate of 8000 per second. The principle of the invention also applies to any analog-to-digital and digital-to-analog conversion technique. The digital information, whether in serial or parallel configuration, can be delayed by the use of shift registers, and the feedpoint of the shift register(s) can be controlled by the occurrence of pauses in the speech in such a way as to bypass much of the "useless" digital information contained in the speech pauses. This bypassing need only occur long enough to make up for the delay incurred by the preamble transmission.

The principle of the invention also applies to an analog delay line such as a series of capacitor-coupled devices (bucket brigade). The delay line could be made up of a series of analog shift registers. The feedpoint of such a delay line would be any one of the inputs to the individual stages of the delay line. This feedpoint could be controlled in the same manner as the preferred embodiment. The signal passing through the feedpoint, instead of six parallel bits, would be a series of analog voltages varying at the sampling rate required to reproduce the audio signal being delayed.

Obviously many modifications and variations of the present invention are possible in the light of the above teachings. It is therefore to be understood that within the scope of the appended claims the invention may be practiced otherwise than as specifically described.

What is claimed is:

1. A voice-controlled disappearing audio delay apparatus for use with a voice scrambler transmitter, the combination comprising:

a. input means for receiving voice generated signals;

b. first means coupled to said input means for delaying the incoming voice signal for a predetermined time duration equal to the time required for a scrambler preamble to be transmitted, c. second means coupled to said input means and to said first means for incrementally removing the delay of the voice signal in response to pauses of predetermined time durations in said voice generated signals.

2. The apparatus of claim 1 and further comprising digitizing means coupled to said input means and to said second means for digitizing the voice generated signals before being coupled to said first means.

3. The apparatus of claim 2 wherein said first means comprises a plurality of delay means to form at least one delay line.

4. The apparatus of claim 3 wherein said second means comprises circuit means responsive to pauses of a predetermind time duration in a voice signal message to remove a portion of said delay line each time a pause occurs.

5. The apparatus of claim 3 wherein said delay line comprises a plurality of shift registers each controlled by a gate circuit and being connected so that every gate in the delay line is a possible feedpoint for the delay line and only one gate is opened for passing a signal at any time.

6. The apparatus of claim 5 wherein said second means includes multiplexer circuit means having a plurality of outputs corresponding to the number of gate circuits and said multiplexer providing a plurality of gate pulses in response to succeeding pauses in the voice signal to successively feed the voice signal to one less shift register until the nth shift register is the feedpoint and the voice signal is fed without delay to the output.

7. The apparatus of claim 6 wherein said second means includes a signal sorter circuit responsive to a pause in the voice signal of a predetermined time duration for providing a shift pulse to said multiplexer.

8. A voice-controlled disappearing audio delay apparatus for use with a voice scrambler transmitter, the combination comprising:

a. an input terminal for receiving voice generated signals, b. a voice signal activated switch connected to said input for providing first and second output signals, c. an analog to digital converter connected to said input terminal for providing a plurality of digital outputs, d. a digital-to-analog converter having a plurality of inputs equal to the number of outputs of said analog-to-digital converter, e. a plurality of delay lines connecting the outputs of said analog to digital converter to the inputs of said digital-to-analog converter for delaying each bit from said analog-to-digital converter the same, f. a pulse sorter connected to said voice controlled switch for generating an output pulse when the output signal from said switch is below a predetermined value for a predetermined time duration, g. each of said delay lines comprising a plurality of gate circuits having their data inputs connected in parallel to one of the outputs of said analog-to-digital converter, h. a shift register associated with each of said gate circuits, said shift register being serially connected so that any of said gate circuits can be a feedpoint from the outputs of said analog-to-digital converter.

9. The apparatus of claim 8 and further comprising a multiplexer circuit having an input connected to said pulse sorter circuit and a plurality of outputs, each of which is connected, respectively, to one of said gate circuits for providing output pulses in response to an output from said pulse sorter to shift the feedpoint to said shift registers.

* * * * *